United States Patent
Shimazaki (10) Patent No.: US 6,910,875 B2
(45) Date of Patent: Jun. 28, 2005

(54) DEVICE FOR PRODUCING AN UNVULCANIZED RUBBER MEMBER FOR TIRE MANUFACTURING

(75) Inventor: Nobuyoshi Shimazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 332 days.

(21) Appl. No.: 10/139,743

(22) Filed: May 7, 2002

(65) Prior Publication Data

US 2002/0166619 A1 Nov. 14, 2002

(30) Foreign Application Priority Data

May 11, 2001 (JP) ........................................ 2001-141645

(51) Int. Cl.[7] .............................................. B29C 35/02
(52) U.S. Cl. ........................ 425/327; 425/363; 425/369; 425/380; 425/382.3; 425/385
(58) Field of Search ................................ 264/146, 132, 264/177.17, 210.1, 210.2, 284; 425/327, 385, 382.3, 380, 363, 369

(56) References Cited

U.S. PATENT DOCUMENTS

| | | | |
|---|---|---|---|
| 2,907,365 A | * 10/1959 | MacDonald | ............. 152/209.6 |
| 3,880,558 A | 4/1975 | Breher et al. | ................ 425/115 |
| 5,478,516 A | 12/1995 | Malm et al. | ................. 264/146 |
| 5,891,276 A | 4/1999 | Takahashi | ............... 152/209.18 |

FOREIGN PATENT DOCUMENTS

| | | |
|---|---|---|
| EP | 0 522 416 A1 | 1/1993 |
| GB | 756122 | 8/1956 |
| JP | 60-143944 A | 7/1985 |
| JP | 10-067056 A | 3/1998 |

* cited by examiner

Primary Examiner—Benjamin L. Utech
Assistant Examiner—Joseph S. Del Sole
(74) Attorney, Agent, or Firm—Sughrue Mion, PLLC (57) ABSTRACT

The present invention provides a device for producing an unvulcanized rubber member for tire manufacturing. The device includes an extruder with a die that extrudes the unvulcanized rubber member to form multiple rib-protrusions that extend in a direction corresponding to a circumferential direction of the tire. A conveying apparatus receives the unvulcanized rubber member and conveys it in the extrusion direction. A roller has an outer surface with protruding portions that form multiple grooves in the unvulcanized rubber member that extend in a direction radial direction of the tire and intersect the rib-protrusions.

9 Claims, 6 Drawing Sheets

DEVICE FOR PRODUCING AN UNVULCANIZED RUBBER MEMBER FOR TIRE MANUFACTURING

BACKGROUND OF THE INVENTION

1. Field of the Invention

The present invention relates to an unvulcanized rubber member for tire manufacturing, a device for producing the unvulcanized rubber member for tire manufacturing, and a method of producing the unvulcanized rubber member.

2. Description of the Related Art

When a molded unvulcanized tire is charged into a vulcanizing mold and then vulcanized, defects referred to as "lights" may appear on the surface of a fabricated tire after vulcanization. As a result, a problem is caused in that the external appearance of the fabricated tire deteriorates and the commercial value thereof decreases. "Lights" are generally produced due to air remaining between the unvulcanized tire and the vulcanizing mold.

Further, when a molded unvulcanized tire is charged into a vulcanizing mold and then vulcanized, a defect may occur in that air remains at the interior of the fabricated tire after vulcanization. Due to this defect or air void, a problem is caused in that performance and quality of the fabricated tire are deteriorated and the commercial value of the fabricated tire is decreased. Such a defect i.e., production of air void is caused because air remains between members for structuring the tire (which members will be referred to as "tire structuring members" hereinafter), during assembling of the tire structuring members and molding of the unvulcanized tire.

Conventionally, in order to solve these problems, methods such as those described below and the like have been attempted to prevent lights from being produced on the surface of a fabricated tire and prevent air void from being formed at the interior of the fabricated tire by promoting bleeding of residual air:

(1) a plurality of vent holes for air-bleeding are provided inside a vulcanizing mold;

(2) outside coatings, which contain solid fillers for air-bleeding, are applied to the surface of an unvulcanized tire;

(3) a plurality of protrusions or grooves having predetermined size and predetermined pitch are linearly formed, in a circumferential direction of the tire, on the surface of a tire structuring member to be used at the side of the surface of the tire (as disclosed in Japanese Patent Application Laid-Open (JP-A) No. 60-143944);

(4) a plurality of grooves having predetermined pitch and predetermined size are linearly formed, in a radial direction of the tire, on the surface of the tire structuring member to be used at a side of a surface of the tire (as disclosed in Japanese Patent Application Laid-Open (JP-A) No. 10-67056); and (5) air remaining between the tire structuring members is pushed out by "stitching" the members by a metal or rubber roller during assembly;

In reality, however, the conventional methods described above have caused such problems as those described below:

In the method of (1), that is, in providing a plurality of vent holes, a great deal of expense is required, a lot of spews remain on the surface of the fabricated tire after vulcanization, much time and labor is required to remove the spews, and the external appearance of the fabricated tire is damaged;

In the method of (2) of applying the outside coatings, a specific device for the application and considerable expense for coating are necessitated i.e., the coating process thereof is quite time and labor consuming;

In the method of (3) of forming linear protrusions or grooves in the tire circumferential direction, air cannot be bled efficiently from the tire surface because irregularities located along the circumferential direction of the vulcanizing mold or located along a radial direction of the unvulcanized tire hinder bleeding, by way of the linear protrusions or grooves, of the air remaining between the unvulcanized tire and the vulcanizing mold during the vulcanization of the tire;

In the method of (4) of forming linear grooves in the tire radial direction, in order to bleed the air efficiently, it is necessary to form the grooves at considerably fine pitches, whereby a large device and thus a large space are required, which is costly; and In the method of (5), it is impossible to conduct efficient bleeding of the air remaining between the tire structuring members by roll-stitching, because most of the tire structuring members for the unvulcanized tire have high tackiness.

SUMMARY OF THE INVENTION

In view of the aforementioned facts, an object of the present invention is to provide an unvulcanized rubber member for tire manufacturing, in which air at the interior of an unvulcanized tire and/or air between the unvulcanized tire and a vulcanizing mold can be efficiently expelled during tire vulcanization, and a device for producing the unvulcanized rubber member for tire manufacturing.

In order to accomplish the aforementioned objects, a first aspect of the present invention provides an unvulcanized rubber member for tire manufacturing, which member is for forming at least a portion of a green tire, the member comprising: a plurality of rib-protrusions that extend in a direction corresponding to a circumferential direction of the tire; and a plurality of grooves that extend in a direction corresponding to a radial direction of the tire and intersect the rib-protrusions.

Description of operation of the unvulcanized rubber member for tire manufacturing according to the first aspect of the present invention will be given hereinafter.

When the rib-protrusions that extend in the circumferential direction of the tire and the grooves that extend in the radial direction of the tire are provided in the unvulcanized rubber member for tire manufacturing so as to intersect each other, a deficiency in that directions in which air is expelled are limited during vulcanization is mitigated, whereby air remaining at the interior of the green tire and air between the green tire and the vulcanizing mold are allowed to be expelled efficiently.

In accordance with a second aspect of the present invention, each of the rib-protrusions comprises a pitch of 2 to 15 mm, a height of 0.05 to 0.5 mm, and a width of 0.2 to 1.5 mm.

Description of operation of the unvulcanized rubber member for tire manufacturing according to the second aspect of the present invention will be given hereinafter.

If the pitch of the rib-protrusions is less than 2 mm, in a case in which the rib-protrusion is of a type molded by grooves formed at a die provided at an extruder for extrusion molding, the grooves will be disposed too close to one another, thus making it difficult to form the protrusion into the desired configuration. On the other hand, if the pitch of the protrusions is more than 15 mm, an interval between the protrusions will be excessively large, significantly deteriorating the effects of air-bleeding.

If the height of each of the rib-protrusions is less than 0.05 mm, the protrusion will collapse at the initial stage after starting tire vulcanization, whereby the effects of air-bleeding is significantly deteriorated. On the other hand, if the height of the rib-protrusion exceeds 0.5 mm, marks of the protrusions will be produced on a fabricated tire after vulcanization, causing problems to the external appearance of the fabricated tire.

Further, if the width of the rib-protrusion is less than 0.2 mm, an air passage formed at a side of the rib-protrusion at the initial stage after starting the tire vulcanization will be narrower, whereby the effects of air-bleeding is significantly deteriorated. Also, if the width of the rib-protrusion exceeds 1.5 mm, the air passage formed at the side after the rib-protrusion at the initial stage of starting the tire vulcanization will be narrower, whereby the effects of air-bleeding is significantly deteriorated.

In accordance with a third aspect of the present invention, each of the grooves of the unvulcanized rubber member for tire manufacturing of the first or second aspect of the present invention, comprises a pitch of 2 to 15 mm, a height of 0.05 to 0.5 mm, and a width of 0.2 to 1.5 mm.

Description of operation of the unvulcanized rubber member for tire manufacturing according to the third aspect of the present invention will be given hereinafter.

If the pitch of the grooves is less than 2 mm, in a case in which the grooves are formed by an embossing roller having ribs for forming grooves at an outer circumference thereof, the ribs will be disposed too close to one another, thus making it difficult to form the grooves into a desired configuration. On the other hand, if the pitch of the grooves is more than 15 mm, an interval between the grooves is excessively large, whereby the effects of air-bleeding is significantly deteriorated.

If the depth of each groove is less than 0.05 mm, the groove will be filled up at the initial stage after starting the tire vulcanization, whereby the effects of air-bleeding is significantly deteriorated. On the other hand, if the depth of the groove exceeds more than 0.5 mm, marks of grooves will be produced on the fabricated tire after vulcanization, causing problems to the external appearance of the fabricated tire.

If the width of the groove is less than 0.2 mm, the groove will be filled up at the initial stage after starting the tire vulcanization, whereby the effects of air-bleeding is significantly deteriorated. On the other hand, if the width of the groove is more than 1.5 mm, a middle portion of the groove will rise to a shallow depth, whereby the effects of air-bleeding are decreased.

A fourth aspect of the present invention provides a device for producing an unvulcanized rubber member for tire manufacturing of the above-mentioned first aspect, the device comprising: an extruder including a die for continuously extruding the unvulcanized rubber member, the die including notches for forming a plurality of rib-protrusions on the unvulcanized rubber member, which rib-protrusions extend in a direction corresponding to a circumferential direction of the tire; conveying apparatus disposed to receive the unvulcanized rubber member from the extruder and convey the unvulcanized rubber member in the extrusion direction of the unvulcanized rubber member; and a roller disposed to rotate while pressing a surface of the unvulcanized rubber member being conveyed by the conveying apparatus, the roller including an outer circumferential surface with protruding portions for forming a plurality of grooves in the unvulcanized rubber member, which grooves extend in a direction corresponding to a radial direction of the tire and intersect the rib-portions.

Description of operation of a pneumatic tire according to the fourth aspect of the present invention will be made hereinafter.

First, the unvulcanized rubber member is continuously extruded from the extruder. When the unvulcanized rubber member passes through the die of the extruder, multiple rib-protrusions, which extend in the direction corresponding to the circumferential direction of the tire, are formed on the surface of the rubber member by the operation of the notches formed at the die of the extruder.

The unvulcanized rubber member having the rib-protrusions formed on the surface thereof is conveyed in a lengthwise (or extrusion) direction of the rubber member by the conveying device.

The roller having multiple protrusions formed at the outer circumferential surface thereof is pressed to roll on the surface of the unvulcanized rubber member being conveyed, and multiple grooves are formed on the surface of the unvulcanized rubber member having the rib-protrusions formed thereon, to thereby continuously obtain the unvulcanized rubber member having multiple rib-protrusions and multiple grooves intersecting the rib-protrusions formed thereon.

A fifth aspect of the present invention provides a method for producing an unvulcanized rubber member for tire manufacturing, the method comprising the steps of: (a) continuously extruding unvulcanized rubber through a die provided with notches, for forming an unvulcanized rubber member with a plurality of rib-protrusions thereon, which rib-protrusions extend in a direction corresponding to a circumferential direction of the tire; (b) conveying the unvulcanized rubber member in the extrusion direction thereof; and (c) during the step of conveying, pressing the unvulcanized rubber member to form a plurality of grooves therein, which grooves extend in a direction corresponding to a radial direction of the tire and intersect the rib-portions.

DETAILED DESCRIPTION OF THE PREFERRED EMBODIMENT

Figure 1A:
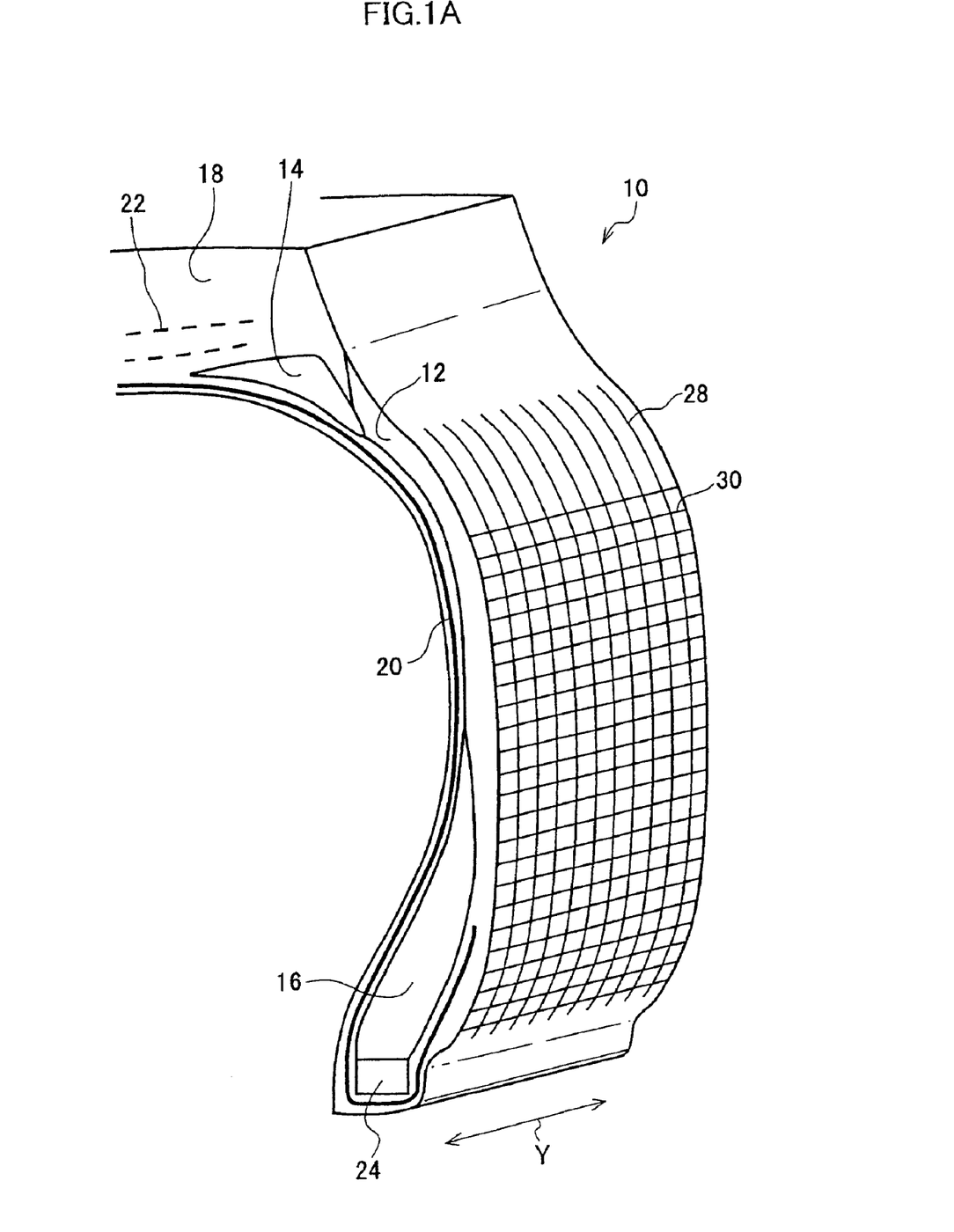
FIG. 1A is a schematic perspective view of a green tire (a portion thereof is shown) structured by using an unvulcanized rubber member for tire manufacturing according to the present invention.
Figure 1B:
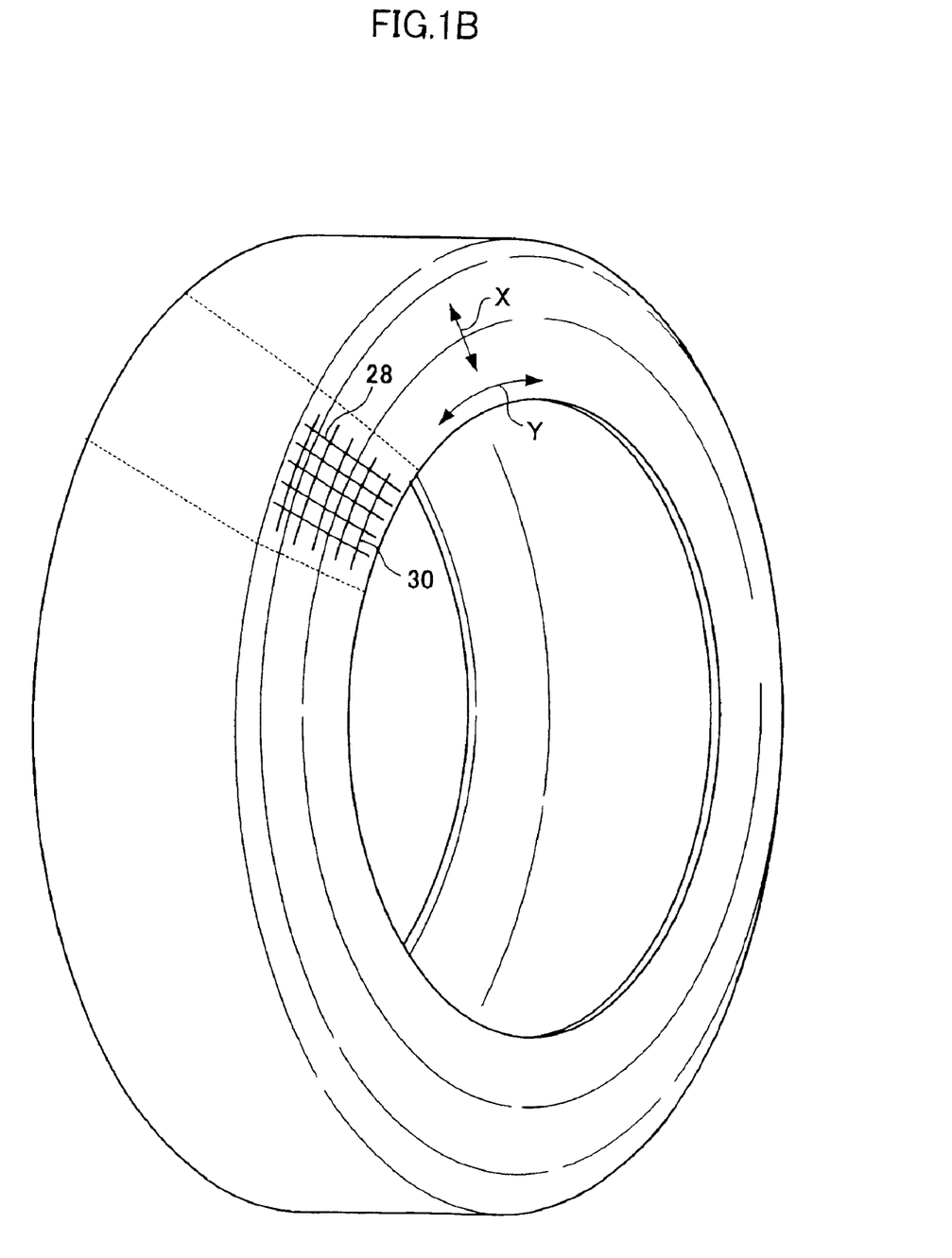
FIG. 1B is a schematic perspective view of the entire green tire including the portion shown in FIG. 1A.

FIG. 1A shows a cross section of a green tire 10 prior to vulcanization. In FIG. 1A, there are shown a sidewall portion structural member 12, a belt-cushion portion structural member 14, a bead-reinforcement portion structural member (bead filler) 16, a tread portion structural member 18, a carcass 20, a belt 22, and a bead core 24. Further, FIG. 1B is a schematic perspective view of the entire green tire including the portions shown in FIG. 1A (however, only structures necessary to understand FIG. 1A are shown).

Figure 2:
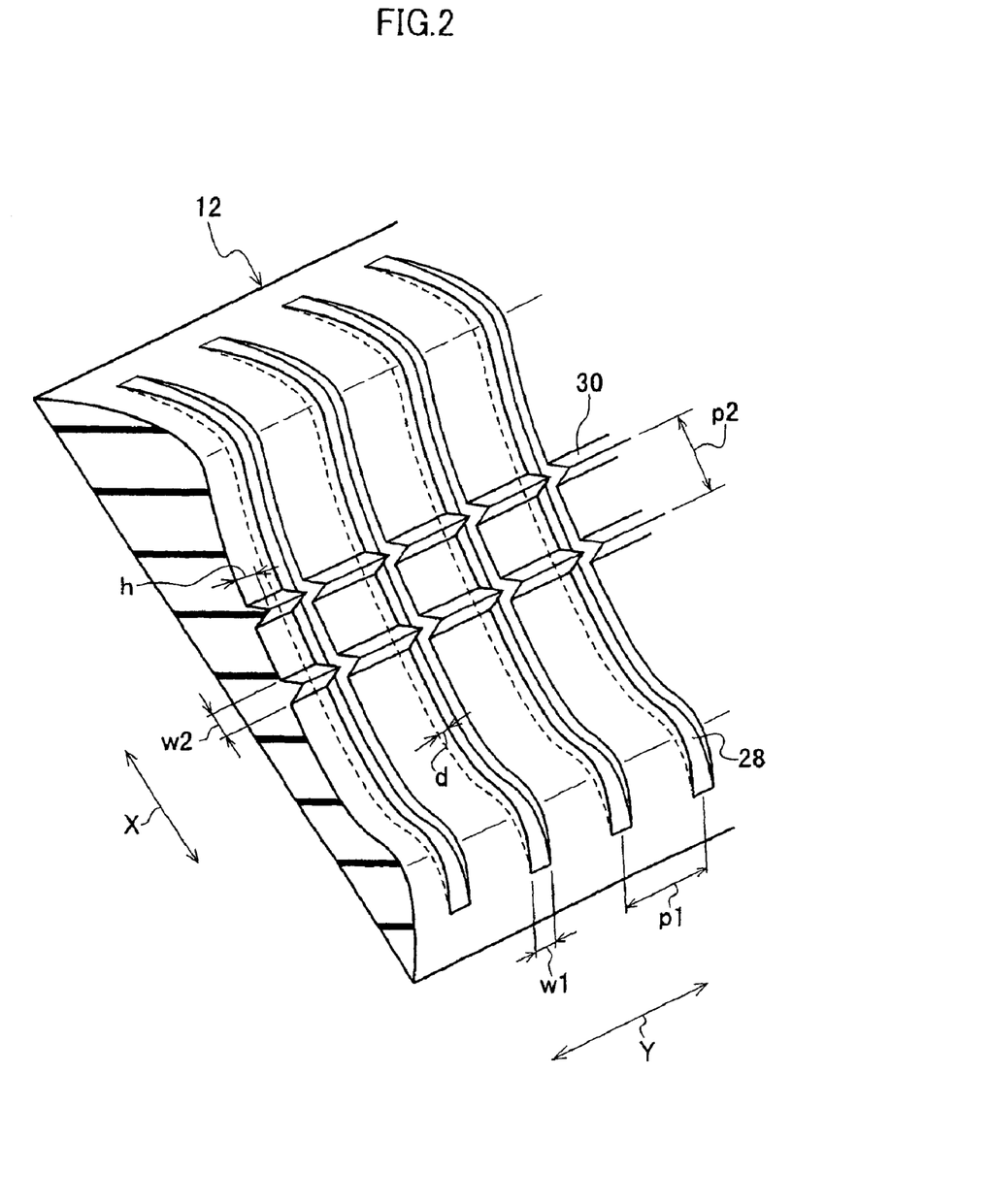
FIG. 2 is a perspective view of a sidewall portion structural member of the green tire in FIG. 1A.

As shown in FIG. 2, a plurality of grooves 28 which extend along a direction corresponding to a radial direction of a tire (direction of arrow X), and a plurality of rib-protrusions 30 that intersect the grooves 28 and extend in a direction corresponding to a circumferential direction of the tire (direction of arrow Y) are formed on a surface of the sidewall portion structural member 12 formed of unvulcanized rubber (i.e., a surface of the side wall portion structural member that is to be an outer surface of a fabricated tire). Note that FIG. 2 is an illustrative and explanatory view in which the grooves 28 and the rib-protrusions 30 are greatly enlarged in order to elucidate the sidewall portion structural member 12.

It is preferable that the grooves 28 have a pitch p1 of 2 to 15 mm, a depth d of 0.05 to 0.5 mm, and a width w1 of 0.2 to 1.5 mm.

Although each groove 28 of FIG. 2 is formed into a quadrilateral cross-sectional configuration in the present embodiment, it can be formed into another configuration, such as a triangular or semi-circular configuration.

It is preferable that the rib-protrusions 30 have a pitch p2 of 2 to 15 mm, a height h of 0.05 to 0.5 mm, and a width w2 of 0.2 to 1.5 mm.

Although each rib-protrusion 30 (of FIG. 2) is formed into a triangular cross-sectional configuration in the present embodiment, it can be formed into another configuration, such as a quadrilateral or semi-circular configuration.

The grooves 28 are formed continuously at portions of intersection of the grooves 28 and the rib-protrusions 30.

Figure 3:
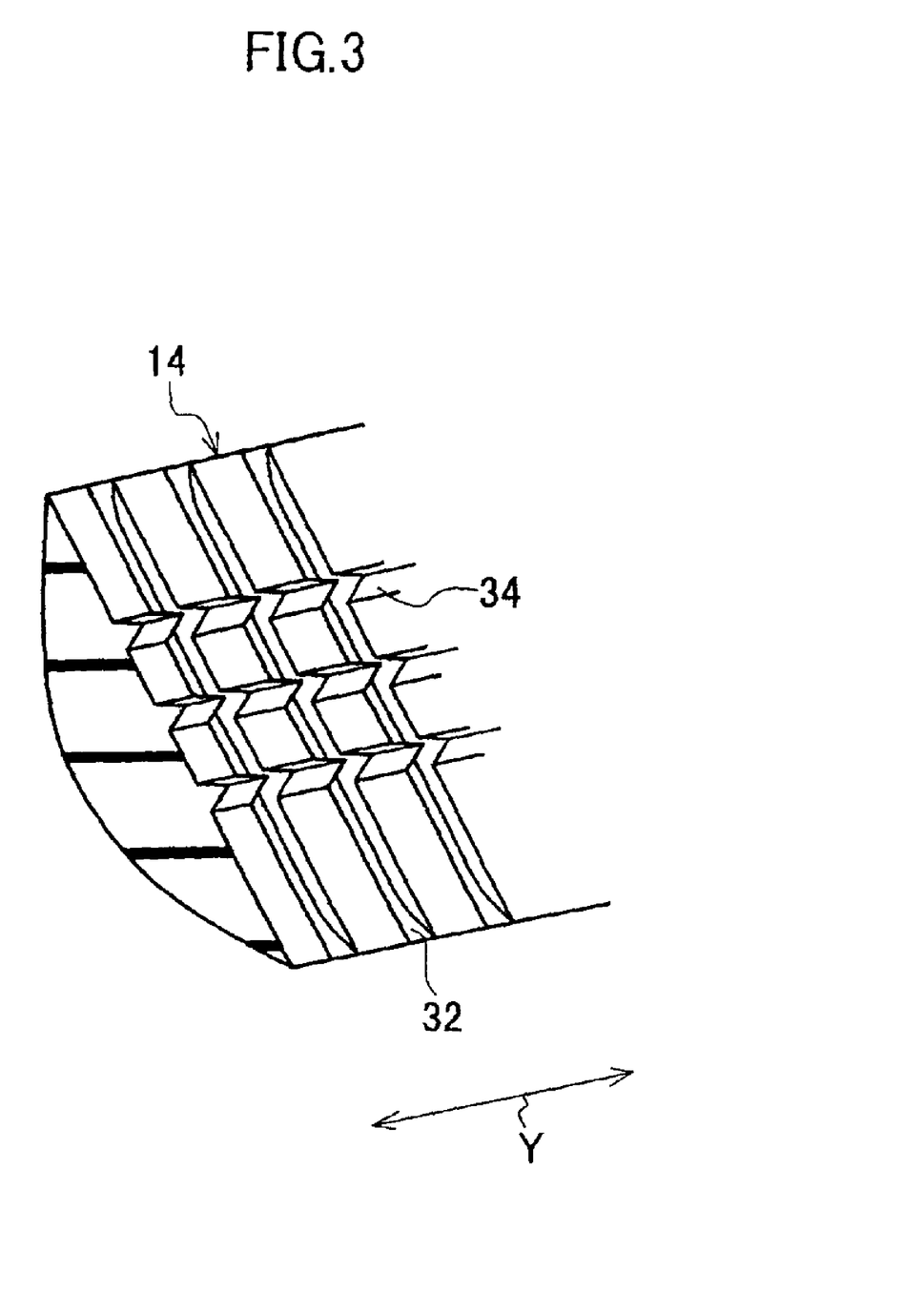
FIG. 3 is a perspective view of a belt-cushion portion structural member of the green tire in FIG. 1A.

As shown in FIG. 3, a plurality of grooves 32 which extends along a direction corresponding to the radial direction of a tire, and a plurality of rib-protrusions 34 that intersect the plurality of the grooves 32 and extends in a direction corresponding to the circumferential direction of the tire are formed on a surface of the belt-cushion portion structural member 14 formed of unvulcanized rubber (i.e., on a surface of the member 14, adhered to the carcass 20).

It is preferable that the grooves 32 have pitch, depth, and width of the same sizes as the pitch p1, the depth d and the width w1 of the above-described grooves 28, and it is also preferable that the rib-protrusions 34 have pitch, width, and height of the same sizes as the pitch p2, the height h and the width w2 of the above-described rib-protrusions 30.

Figure 4:
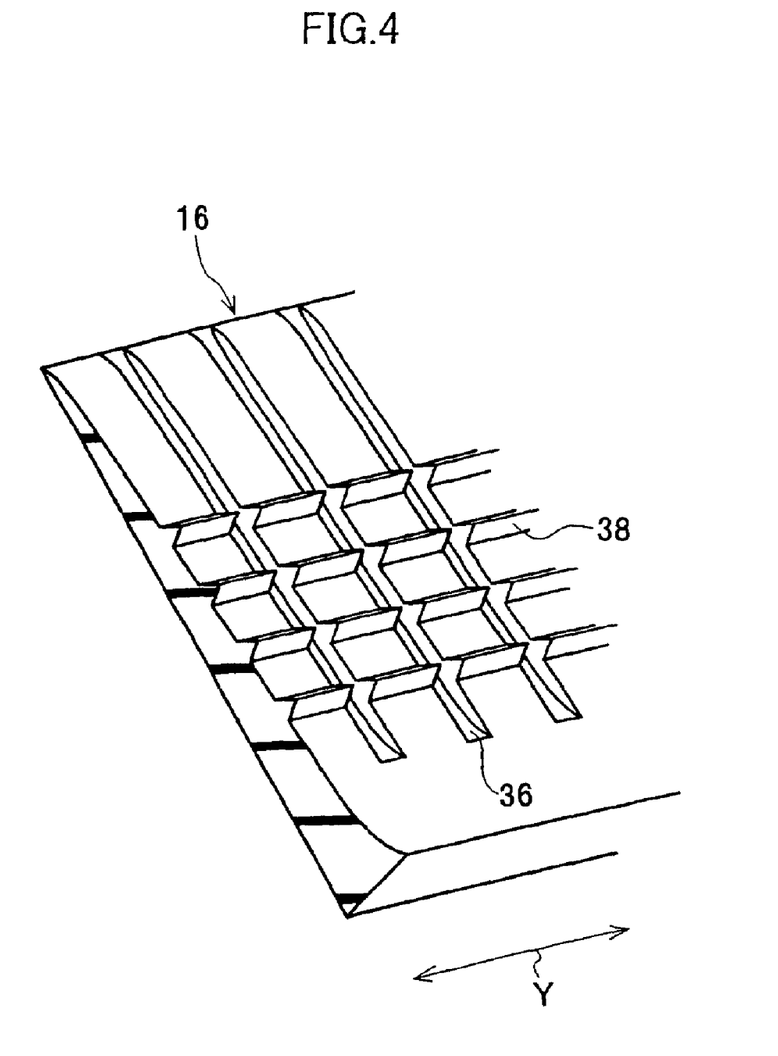
FIG. 4 is a perspective view of a bead-reinforcement portion structural member of the green tire in FIG. 1A.

As shown in FIG. 4, a plurality of grooves 36 which extend along a direction corresponding to the radial direction of the tire, and a plurality of rib-protrusions 38 that intersect the plurality of the grooves 36 and extend in a direction corresponding to the circumferential direction of the tire are formed on a surface of the bead-reinforcement portion structural member 16 formed of unvulcanized rubber (i.e., surface of the member 16 that is to be adhered to the carcass 20).

It is preferable that the grooves 36 have pitch, depth, and width of the same sizes as the pitch p1, the depth d and the width w1 of the above-described groove 28, and it is also preferable that the rib-protrusions 38 have pitch, width, and height of the same sizes as the pitch p2, the height h and the width w2 of the above-described rib-protrusions 30.

An example of a method for forming the grooves 28 and the rib-protrusions 30 of the sidewall portion structural member 12 will be explained hereinafter (and description of a method of forming the grooves 32 and the rib-protrusions 34 of the belt-cushion portion structural member 14 and a method of forming the grooves 36 and the rib-protrusions 38 of the bead-reinforcement portion structural member 16 will be omitted, because these two methods are basically the same as the method for forming the grooves 28 and the rib-protrusions 30).

Figure 5:
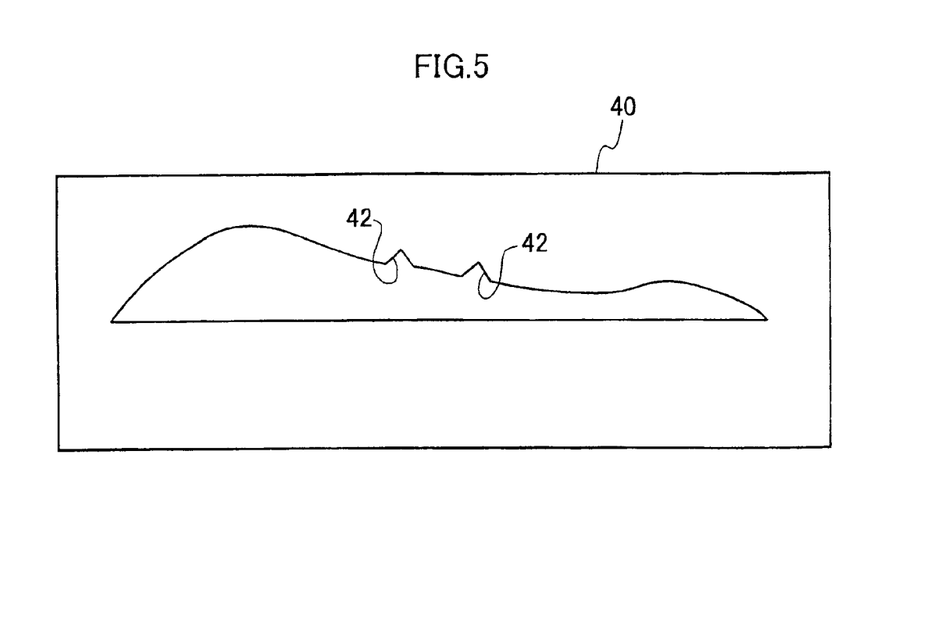
FIG. 5 is a front view of a die which is a portion of a device for producing the unvulcanized rubber member for tire manufacturing according to the present invention.

Ordinarily, the sidewall portion structural member 12 can be extrusion-molded by an extruder and, as shown in FIG. 5, it is desirable that grooves 42 are formed beforehand at a die of the extruder, such that the grooves 42 have shapes complementary to the shapes of the rib-protrusions 30. Accordingly, the sidewall portion structural member 12 having the rib-protrusions 30 formed thereon can be formed continuously.

Figure 6:
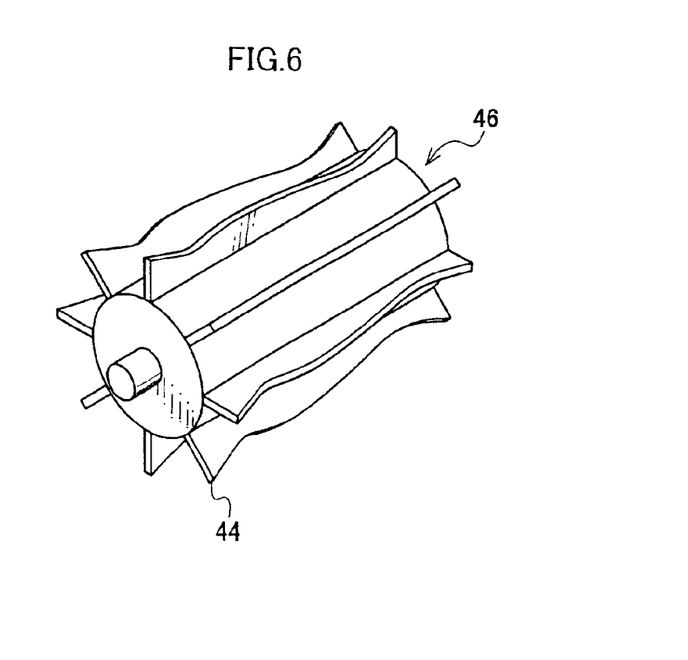
FIG. 6 is a perspective view of a roll which is a portion of the device for producing the unvulcanized rubber member for tire manufacturing according to the present invention.

Next, the sidewall portion structural member 12 having the rib-protrusions 30 formed thereon is continuously conveyed by a conveyor or the like in a lengthwise or extrusion direction. A roll 46, which is shown in FIG. 6 and has ribs 44 formed at an outer circumferential surface thereof, is pressed to roll on the surface of the sidewall portion structural member 12 being conveyed.

Consequently, the grooves 28 and the rib-protrusions 30 shown in FIG. 2 can be formed continuously on the surface of the sidewall portion structural member 12.

Operation

Description of operation of the present embodiment will be given hereinafter.

In the green tire 10, since the grooves 28 extending in the tire radial direction and the rib-protrusions 30 extending along the tire circumferential direction are present together at tire side portions, it is possible to form a lot more passages through which undesired air that is remained between a tire surface and an inner surface of the mold can be expelled during molding of the green tire in the mold, whereby it is possible to overcome a conventional deficiency that air-bleeding directions are limited.

In the present invention, the undesired air remaining between the tire surface and the inner surface of the mold can be distributed in the sufficiently wide and shallow manner, so that the rubber can reliably absorb the air ultimately remained between the tire surface and the inner surface of the mold, whereby lights, which is generated by a relatively large amount of accumulation of localized air, are prevented from being formed at the surface of the fabricated tire.

When the belt-cushion portion structural member 14 is stuck to the carcass 20, air that is liable to be pooled between the belt-cushion portion structural member 14 and the carcass 20 can be let out through the grooves 32 and the rib-protrusions 34. Even when air stays between the belt-cushion portion structural member 14 and the carcass 20, the air can easily be expelled via the grooves 32 and the rib-protrusions 34 by applying pressure to the air during the molding of the tire.

When the bead-reinforcement portion structural member 16 is stuck to the carcass 20, air that is liable to be pooled between the bead-reinforcement portion structural member 16 and the carcass 20 can be let out through the grooves 36 and the rib-protrusions 38. Even when air stays between the bead-reinforcement portion structural member 16 and the carcass 20, the air can easily be expelled via the grooves 36 and the rib-protrusions 38 by applying pressure to the air during the molding of the tire.

Therefore, generation of air residue between the tire structuring members can be reliably prevented.

If the pitch p1 of the grooves 28 is less than 2 mm, the ribs 44 of the roll 46 have to be put excessively close to one another, thereby making it difficult to form the grooves in the desired configuration. If the pitch p1 of the grooves 28 exceeds 15 mm, an interval between the grooves will be excessively large, thereby deteriorating the air-bleeding effect.

If the depth d of the grooves 28 is less than 0.05 mm, the grooves 28 will be filled up at the initial stage after starting tire vulcanization, whereby the air-bleeding effect is significantly deteriorated. If the depth d of the grooves 28 exceeds 0.5 mm, marks of the grooves 28 will be produced on the fabricated tire after vulcanization, causing problems to the external appearance of the fabricated tire.

If the width w1 of the grooves 28 is less than 0.2 mm, the grooves 28 will be filled up at the initial stage after starting the tire vulcanization, whereby the air-bleeding effect is significantly deteriorated. If the width w1 of the grooves 28 exceeds 1.5 mm, middle portions of the grooves 28 will rise at a shallow depth, whereby the air-bleeding effect is decreased.

If the pitch p2 of the rib-protrusions 30 is less than 2 mm, the grooves formed at the die, which is equipped at the extruder for extrusion molding, will be put excessively close to one another, making it difficult to form the protrusions into the desired configuration. If the pitch p2 exceeds 15 mm, an interval between the protrusions will be excessively large, whereby the air-bleeding effect is significantly deteriorated.

If the height h of the rib-protrusions 30 is less than 0.05 mm, the protrusions will collapse at the initial stage after starting the tire vulcanization, whereby the air-bleeding effect is significantly deteriorated. If the height h exceeds 0.5 mm, marks of the protrusions will be produced on the fabricated tire after vulcanization, thereby causing problems to the external appearance of the fabricated tire.

If the width w2 of the rib-protrusions 30 is less than 0.2 mm, air passages formed at the sides of the rib-protrusions 30 at the initial stage after starting the tire vulcanization will be narrower, whereby the air-bleeding effect is significantly deteriorated. If the width w2 exceeds 1.5 mm, the air passages formed at the sides of the rib-protrusions 30 at the initial stage after starting the tire vulcanization will be narrower, whereby the air-bleeding effect is significantly decreased.

In the above-described embodiment of the present invention, the grooves 28 and the rib-protrusions 30 can be formed continuously on the surface of the sidewall portion structural member 12, as shown in FIG. 2.

Further, in the above-described embodiment of the present invention, the grooves and rib-protrusions are formed on the sidewall portion structural member 12, the belt-cushion portion structural member 14, and the bead-reinforcement portion structural member 16. However, the present invention is not limited to this, and grooves and rib-protrusions can be formed on others of the unvulcanized rubber members for tire manufacturing.

As described above, according to the unvulcanized rubber member for tire manufacturing of the present invention, an excellent effect is provided in that air at the interior of the unvulcanized tire and air between the unvulcanized tire and the vulcanizing mold can be effectively expelled.

Further, according to the device for producing the unvulcanized rubber member for tire manufacturing of the present invention, an excellent effect is provided in that the unvulcanized rubber member for tire manufacturing, in which the air at the interior of the unvulcanized tire and the air between the unvulcanized tire and the vulcanizing mold can be efficiently expelled, is produced efficiently.

What is claimed is:

1. A device for producing an unvulcanized rubber member for tire manufacturing, the device comprising:

an extruder including a die for continuously extruding the unvulcanized rubber member, the die including notches for forming a plurality of rib-protrusions on the unvulcanized rubber member, which rib-protrusions extend in a direction corresponding to a circumferential direction of the tire;

conveying apparatus disposed to receive the unvulcanized rubber member from the extruder and convey the unvulcanized rubber member in the extrusion direction of the unvulcanized rubber member; and a roller disposed to rotate while pressing a surface of the unvulcanized rubber member being conveyed by the conveying apparatus, the roller including an outer circumferential surface with protruding portions for forming a plurality of continuous grooves in the unvulcanized rubber member, each of said grooves extending continuously in a direction corresponding to a radial direction of the tire and intersecting the plurality of rib-protrusions.

2. The device according to claim 1, wherein each of the notches comprises a pitch of 2 to 15 mm, a depth of 0.05 to 0.5 mm, and a width of 0.2 to 1.5 mm.

3. The device according to claim 1, wherein each of the protruding portions comprises a pitch of 2 to 15 mm, a height of 0.05 to 0.5 mm, and a width of 0.2 to 1.5 mm.

4. The device according to claim 1, wherein the extruder comprises structure for extruding a sidewall portion structural member.

5. The device according to claim 4, wherein the die comprises a portion for forming an outer surface of the sidewall portion structural member, which outer surface is to be an outer surface of the fabricated tire, and the notches are formed at said portion for forming an outer surface of the sidewall portion structural member, of the die.

6. The device according to claim 1, wherein the tire is to include a carcass and a belt, and the extruder comprises structure for extruding a belt-cushion portion structural member to be disposed between the carcass and the belt.

7. The device according to claim 6, wherein the die comprises a portion for forming a surface of the belt-cushion portion structural member, which surface is to be closely contacted with the carcass, and the notches are formed at said portion for forming a surface of the belt-cushion portion structural member, of the die.

8. The device according to claim 1, wherein the extruder comprises structure for extruding a bead-reinforcement portion structural member including a bead filler.

9. The device according to claim 8, wherein the die comprises a portion for forming a surface of the bead-reinforcement portion structural member, which surface is to be adhered with the carcass, and the notches are formed at said portion for forming a surface of the belt-reinforcement portion structural member, of the die.

* * * * *